Nov. 2, 1926.  
M. D. DOMINGUEZ  
1,604,980  
AUTOMATIC HOT WATER HEATER  
Original Filed April 29, 1924    5 Sheets-Sheet 1
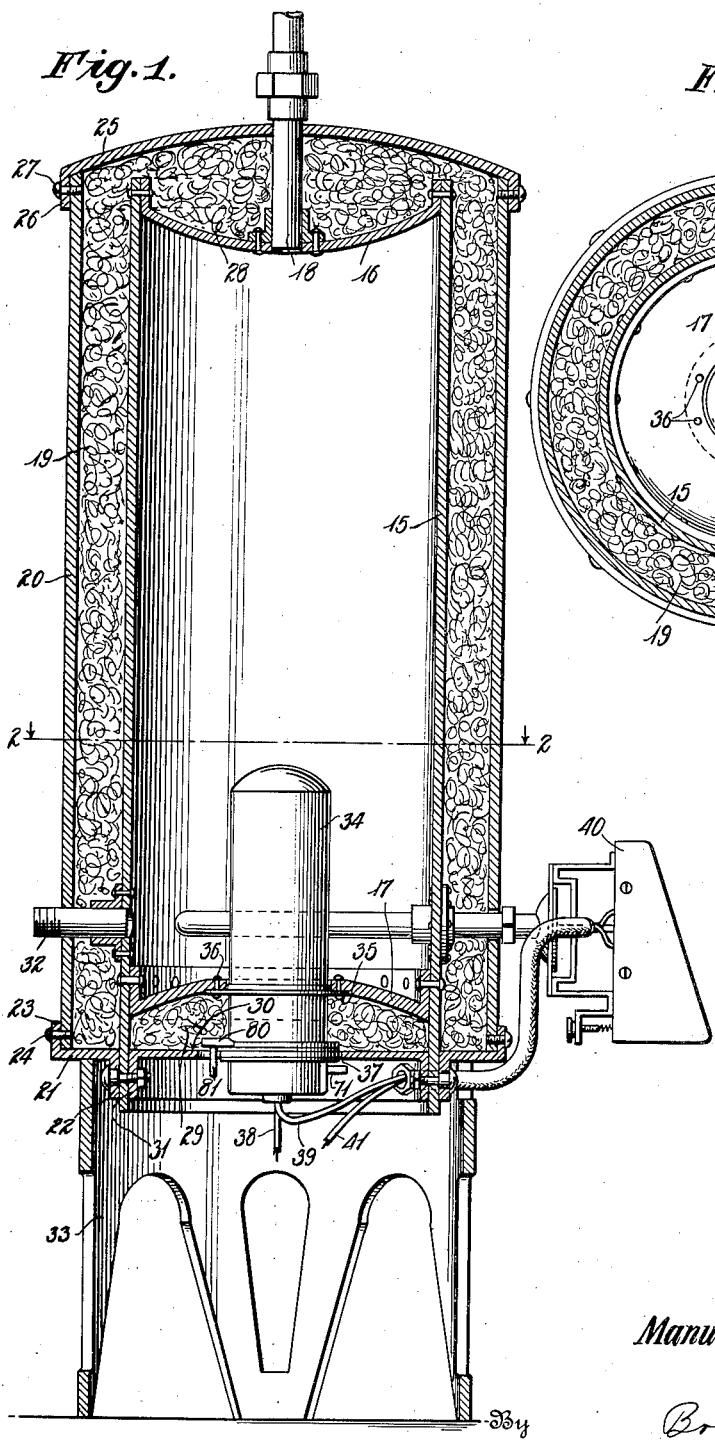
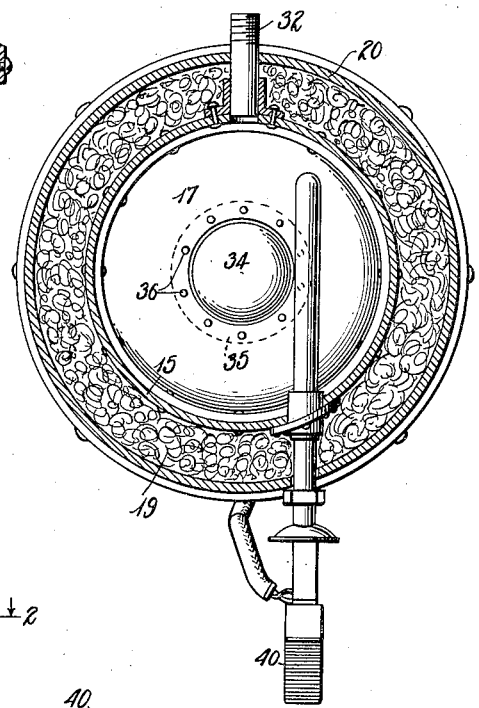
Inventor  
Manuel D. Dominguez  
By Brown & Phelps  
Attorneys Nov. 2, 1926.  
M. D. DOMINGUEZ  
1,604,980  
AUTOMATIC HOT WATER HEATER  
Original Filed April 29, 1924  5 Sheets-Sheet 2

Inventor  
Manuel D. Dominguez  
By Brown & Phelps  
Attorneys

Nov. 2, 1926.
M. D. DOMINGUEZ
1,604,980
AUTOMATIC HOT WATER HEATER
Original Filed April 29, 1924   5 Sheets-Sheet 3

Inventor
Manuel D. Dominguez

By Boower & Phelps
Attorneys

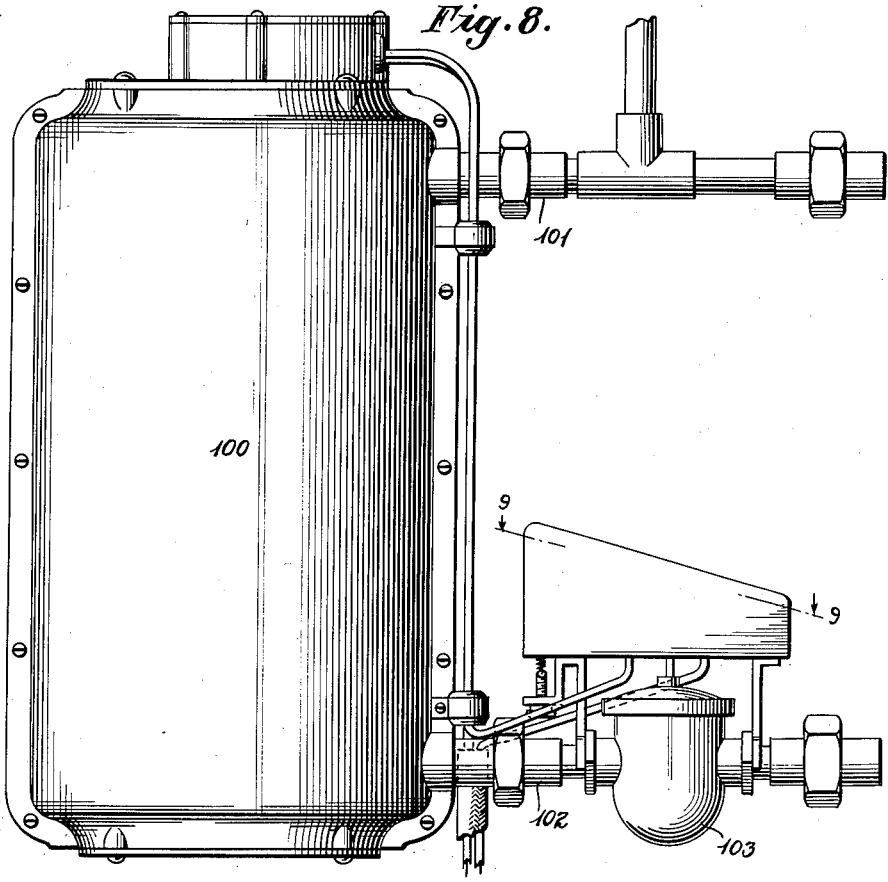
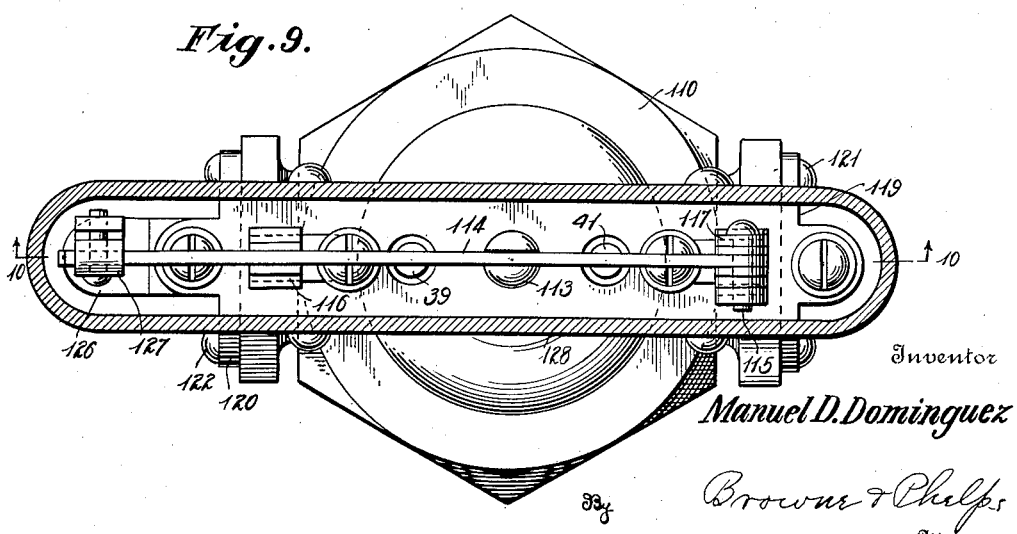

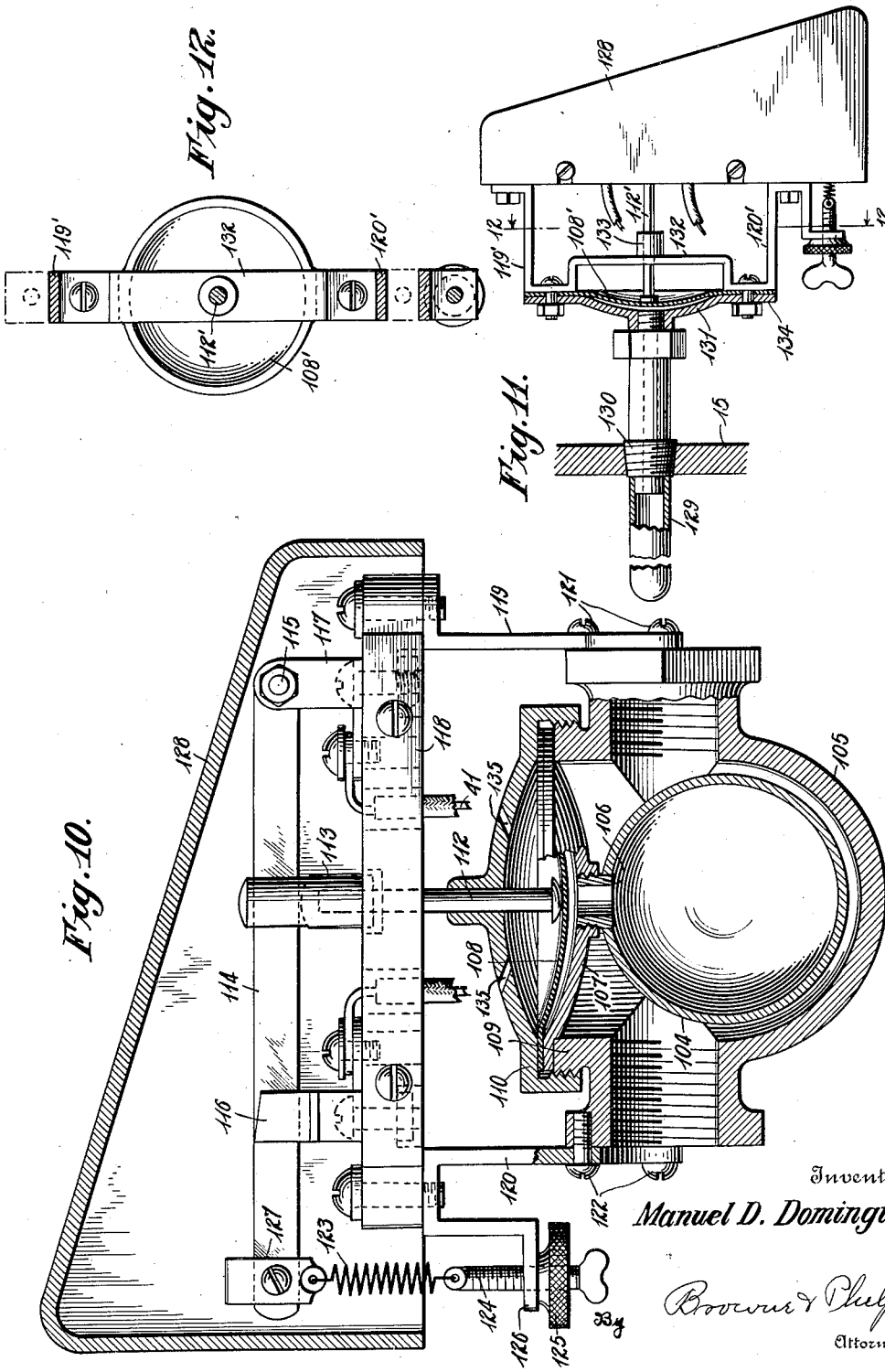

Patented Nov. 2, 1926.

1,604,980

UNITED STATES PATENT OFFICE.

MANUEL D. DOMINGUEZ, OF NEW ORLEANS, LOUISIANA, ASSIGNOR TO CHARLES A. DENIS AND GEORGE SARPY, BOTH OF NEW ORLEANS, LOUISIANA.

AUTOMATIC HOT-WATER HEATER.

Application filed April 29, 1924, Serial No. 709,902. Renewed April 6, 1926.

Figure 3:
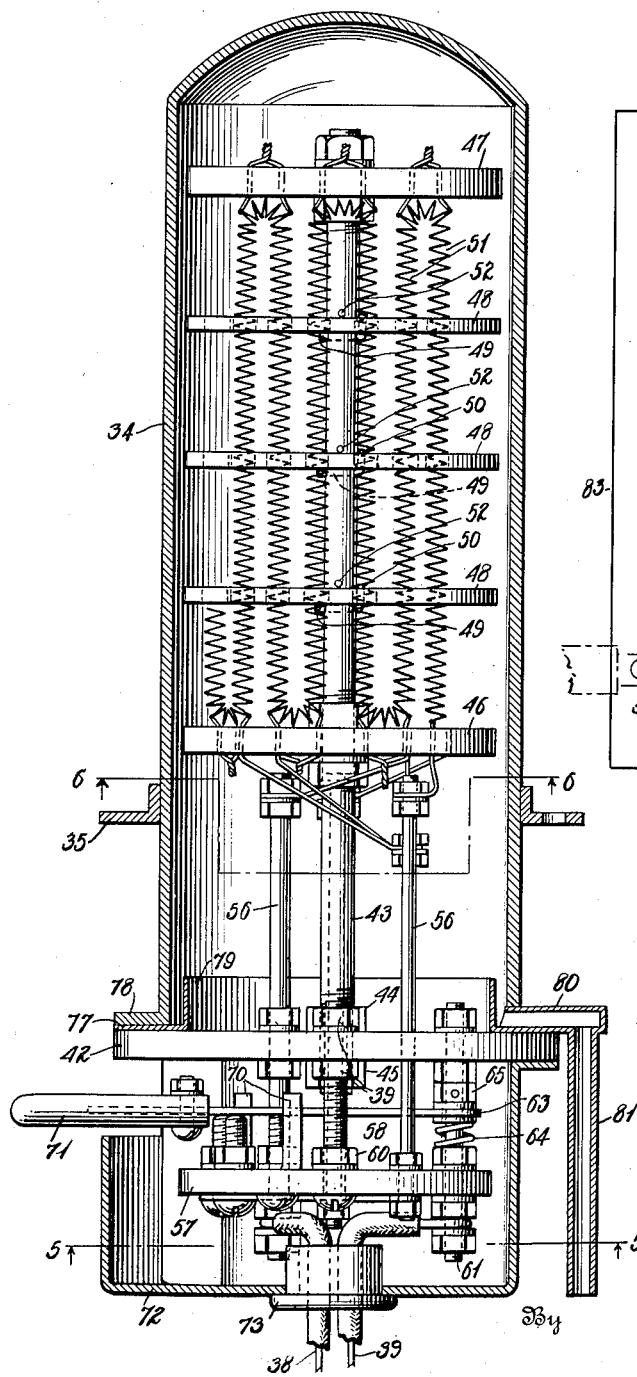
Figure 4:
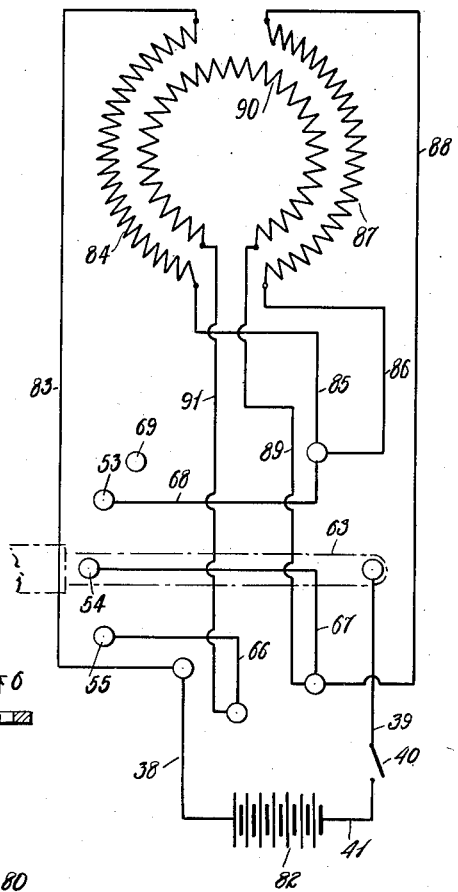
Figure 5:
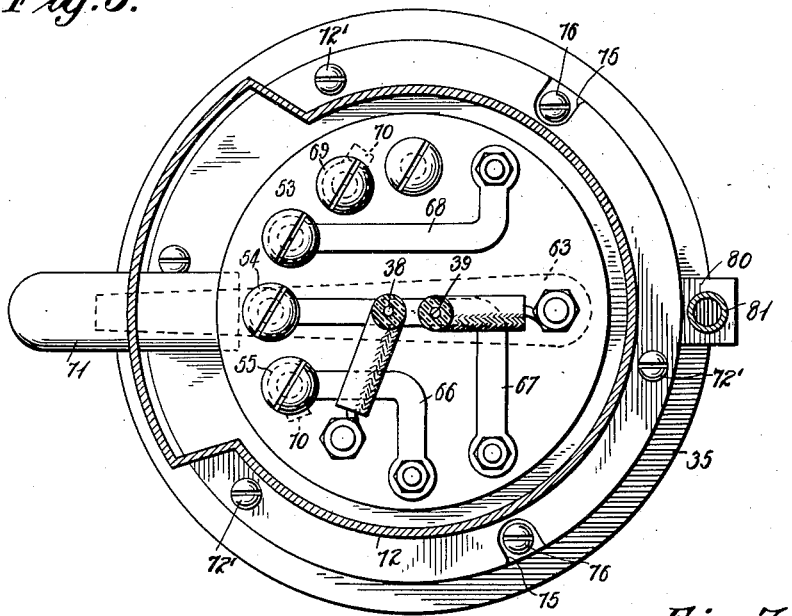
Figure 6:
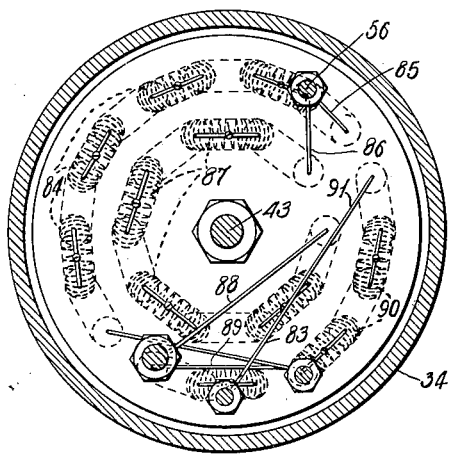
Figure 7:
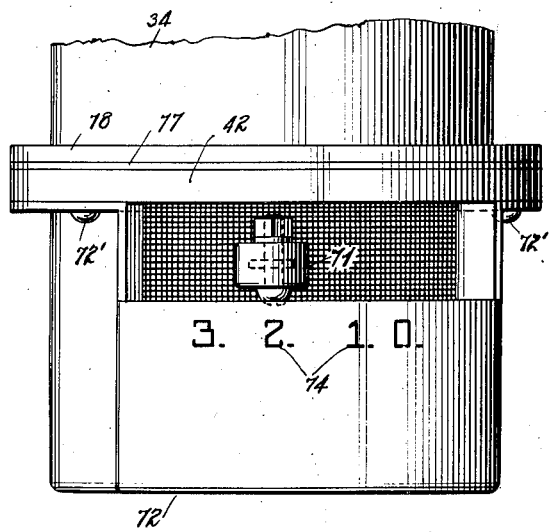

The invention relates to automatic hot water heaters, and has as an object the provision of a hot water heating tank with efficient heat insulation. A further object of the invention is the provision of an automatic hot water tank with a heating unit in the center of the bottom thereof, whereby to have its effect upon the coldest portion of the water.
A further object of the invention is the provision of hot water heater having a plurality of heats, and means to control the action of the heating means.
A further object of the invention is the provision of a pressure operated switch with thermostatic means to control the same.
A further object of the invention is the provision of a heating unit for hot water heaters having means to drain water of condensation therefrom.
Further objects of the invention will appear from the following description when read in connection with the accompanying drawings, showing illustrative embodiments
of the invention and wherein—
Fig. 1 is a vertical longitudinal section of a hot water tank with a heater in place.
Fig. 2 is a horizontal section on line 2, 2 of Fig. 1.
Fig. 3 is a central vertical section of the heating unit.
Fig. 4 is a diagrammatic view of circuits.
Fig. 5 is a horizontal section on line 5, 5 of Fig. 3.
Fig. 6 is a like section on line 6, 6 of Fig. 3.
Fig. 7 is a detail vertical side view of a portion of the heater.
Fig. 8 is a side elevation of the modified form of heater with a modified form of the pressure operated automatic switch.
Fig. 9 is a detail section on line 9, 9 of Fig. 8 upon an enlarged scale.
Fig. 10 is a vertical section on line 10, 10 of Fig. 9.
Fig. 11 is a detail side elevation, partly broken away, of the form of thermostatic element shown in Figs. 1 and 2.
Fig. 12 is a detail section on line 12, 12 of Fig. 11, drawn upon an enlarged scale.
As shown in Figs. 1 to 7 inclusive, and Figs. 11 and 12, the device comprises a hot water tank 15 formed of a cylinder having concave end closures 16, 17, secured within the same as by means of riveting or electric welding. To conduct hot water from the tank an outlet pipe 18 is indicated as communicating with the central portion of the upper end of the tank.

To heat insulate the tank, there is shown a space 19 which may be filled with suitable heat insulating material, as wool or cork, and enclosed by a cylindrical casing 20. To support the casing 20 at the lower end an enlarged flange 21 is shown provided with a downwardly extending ring 22 shown as riveted to an extension of the walls of the cylinder 15 beyond the end 17. The member 21 is also shown as having an upwardly projecting annular ring 23 about its edge, within which ring the cylinder 20 telescopes, and may be secured as by means of screws 24. The upper end of the cylinder 20 is shown as closed by a cap member 25 having a downwardly turned edge 26, also shown as secured by screws 27 to the cylinder 20.

The spaces 28, 29 in the hollows of the concave ends 16, 17 of the hot water tank are filled with heat insulating material in the same manner as the annular space 19. To close the space 29, there is shown a disk 30 having downwardly turned flange 31 about its edge, which is secured within the lower end of the cylinder 15.

An inlet for cold water supply to the tank is shown in the form of a pipe 32 communicating with the cylinder 15 adjacent to the bottom thereof. The entire device is shown as supported upon a stand 33.

To heat the water within the tank an electric heater is shown comprising a casing 34 preferably of a metal such as copper, which is a ready conductor of heat, and which casing projects through an opening in the central portion of the bottom 17 of the tank, and is secured thereto by means of a flange 35, secured to the casing 34, and to the bottom 17, as by rivets 36. The casing is shown as projecting through an opening 37 in the closure 30. To conduct current to the heater, lead in wires 38, 39 are shown, the latter passing to a thermostatically operated switch 40, to which current is conducted as by means of a wire 41.

The heating element as shown in Figs. 3 to 7 inclusive is mounted upon a block of insulation 42 and supported thereon by means of a central rod 43, which may be attached to the block 42 as by means of lock nuts 44, 45. Mounted upon the rod 43, there are shown end disks of insulating material, 46, 47, and intermediate or spacing disks 48, the latter shown as supported upon said rod by means of pins 49 having upturned ends 50 projecting through holes in the disk 47 to preserve the position of rotation of the disk upon the rod so as to preserve the alignment of the openings in the disk through which the resistance coils 51 extend, whereby to keep the coils in spaced relation. Upon the opposite side of each of the disks 48 there is shown a pin 52 to prevent the disks separating from the pins 49.

The heating elements 51 are shown as being connected with switch points 53, 54, 55, by means of connecting rods 56, and connecting strips 66, 67 and 68. The switch points 53 to 55 inclusive are shown as mounted upon a block of insulating material 57 which is supported in spaced relation from the block 42, as by means of screw threaded members 58, provided with lock nuts 59, 60. Also mounted upon a rod 61 extending between blocks 42 and 57, there is shown a switch lever 63 pressed by means of a spring 64 against a nut 65 pinned to the rod 61, the spring being provided to ensure good electrical contact at all times. The lead in wire 39 is shown as connected to the switch lever 63 through the medium of the rod 61, and the opposite lead in wire 38 is connected to one of the rods 56, which latter rod is not directly connected to any of the switch points. The switch point 55 and a blank switch point 69 are each shown as provided with stop members 70 to limit the throw of the switch lever 63. The switch lever is shown as provided with an insulating handle 71 projecting to the exterior of the cap 72, which is mounted upon the block 42 by means of screws 72'.

An insulating bushing 73 is preferably provided about the opening in the cap 72 through which the lead in wires 38 and 39 extend. A scale 74 may be provided upon the exterior of the casing 72, as shown in Fig. 7, to indicate the different heats to which the switch may be turned. The flange of the cap 72 for the reception of screw 72' is shown as provided with recesses 75 to surround the screws 76, by means of which the casing 34 is secured to the block 42, so that the cap may be removed without disturbing the last named screws.

When the heater is out of operation cold water in the tank may cause condensation of water upon the interior of the casing 34. To provide for removal by drainage of such water of condensation an annular plate 77 is shown mounted upon the flange 78 of the casing 34 and the block 42, which plate bears an up-standing collar 79 in spaced relation to the wall of the casing 34 to provide an annular channel. At the bottom of the casing a conduit 80 is provided extending through the wall of the casing 34 and in communication with a drain pipe 81.

As shown in Fig. 4, the circuits for the heater are as follows: from the source of energy 82 through wire 38 to wire 83, section 84 of the heating element, wire 85, strip 68, switch point 53, switch arm 63, wire 39 to the pressure-operated switch 40, wire 41 to the source of energy, for the first heat. For the next higher heat, the circuit would include wire 85, wire 86, heating element section 87, wire 88, strip 67, contact point 54 and switch lever 63, as in first heat. For the third heat, the circuit would include wire 88, wire 89, heating element section 90, wire 91, conducting strip 66, contact point 55 to the switch lever 63.

As shown in Figs. 8 and 9, the water to be heated is present in a coil contained in a casing 100, which may be of the nature disclosed in my co-pending application 676,413, filed November 22, 1923. The casing is shown as having an outlet pipe 101 for heated water extending therefrom, and inlet pipe 102 for water to be heated, into which latter pipe there is connected a casing 103 containing a thermostatic element in the form of spherical shell 104 (see Fig. 10), about which the water passing to the heater flows.

The casing 103 is shown as formed with a semi-spherical projection 105 to provide a passage for the water about the shell 104. The shell which may contain a substance whose volume is readily effected by changes in heat, such as air, has its interior in communication by a duct 106, with a space closed upon one side by means of a concave disk 107, and upon its opposite side by means of a flexible diaphragm 108. The edges of the diaphragm are shown as clamped between the member 107 seated upon an edge of an externally threaded flange 109, and clamped by means of a cap 110 coacting with the external threads upon the flange 109. A pin 112 is shown as contacting with the flexible diaphragm 108. Vents 135 are shown in cap 110.

The pin 112 is shown as connected to a switch blade actuating member 113, through which the switch blade 114, pivoted at 115, projects. To make electrical connection with the blade 114, separated contacts 116 are shown, the contacts and the switch blade pivoting bracket 117 being mounted upon a block of insulating material 118, which latter may be carried by bracket members 119, 120 mounted upon the fitting 105, as by screws 121, 122.

To urge the switch blade 114 to closed position there is shown a helical spring 123 anchored to an adjustable screw 124 which may be held in adjusted position by means of a nut lock 125 and seated against a bracket 126, carried by the block of insulating material 118. The spring 123 is shown as attached to the switch blade 114 by means of a clip 127. The wires 39 and 41 are connected to the contacts 116 and the mounting 117 for the switch blade as shown. When water in the pipe 102 is below the temperature at which it is desired to keep the same the thermostatic material in shell 104 will have such a volume as to allow the diaphragm 108 to be forced to the position shown in Fig. 10, through the medium of the spring 133.

As the temperature of the water is raised and the volume of the thermostatic material expands, the pin 112 will be actuated to open the switch, thereby providing automatic heat regulation. The switch may be covered with a cap 128 mounted upon the insulating block 118.

With the form of the device shown in Figs. 1 to 7 inclusive, the shell 104 of Fig. 10 is replaced by means of a cylindrical shell 129 mounted in a plug 130, adapted to have screw threaded engagement with the wall 15 of the water tank. The shell 129 which is closed at its end, and is preferably formed of copper or other readily heat conducting material, is in communication with a concave disk 131, the space within which is closed by means of the flexible diaphragm 108' already described. In the form of the switch shown in Figs. 11 and 12, the brackets 119', 120' are shown as formed integral with a strap 132, which carries the guide 133 for the pin 112', which bracket is shown as mounted upon the extended edge 134 of the concave disk 131.

I claim:

1. A hot water tank comprising a cylinder, a closure for each end of said cylinder, one of said closures spaced inwardly from its end of the cylinder, a disk having a marginal flange fitting into the latter end of the cylinder in spaced relation to said closure, an annular collar having a marginal flange fitted over the outside of the last named end of the cylinder, fastening means passing through the wall of the cylinder and said flanges, said annular member having an upstanding flange on its outer margin, a casing telescoping with said last-named flange, a closure for the remaining end of said casing standing in spaced relation to the enclosed tank, heat insulating material placed in the space between said tank and its enclosure and between said lower tank closure and disk, and means projecting through said spaced closures for heating water in the tank.

2. An automatic water heater comprising, in combination, a tank, an electrical heating element, a casing for said heating element projecting through the bottom of said tank and secured thereto, means to drain water of condensation from the interior of said casing.

3. A heating element comprising a casing having a closed end, a flange intermediate of its length adapted to be secured to the wall of a tank, an outwardly projecting flange at its open end, an annular ring seated upon said last-named flange and having an upstanding flange upon its inner margin extending in spaced relation with the wall of the tank, a block of insulating material secured to said flange and clamping said annular ring in place, a conduit for draining water of condensation from the annular space between the tank wall and the upstanding ring.

4. An electric heating element comprising a casing closed at one end, a block of insulating material closing the remaining end of the casing, resistance elements supported from said block and extending within the casing, switch means supported upon the outer surface of the block comprising a switch lever and switch points connected to various combinations of the resistance elements to provide various degrees of heat.

MANUEL D. DOMINGUEZ.